United States Patent
Peng

(10) Patent No.: US 11,119,287 B1
(45) Date of Patent: Sep. 14, 2021

(54) OPTICAL TRANSCEIVER AND FIBER ARRAY THEREOF

(71) Applicant: Prime World International Holdings Ltd., New Taipei (TW)

(72) Inventor: Cheng-Te Peng, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 16/857,966

(22) Filed: Apr. 24, 2020

(51) Int. Cl.
| | |
|---|---|
| *G02B 6/42* | (2006.01) |
| *G02B 6/32* | (2006.01) |
| *H04B 10/40* | (2013.01) |
| *G02B 3/00* | (2006.01) |
| *G02B 6/36* | (2006.01) |

(52) U.S. Cl.
CPC ............ *G02B 6/4214* (2013.01); *G02B 6/32* (2013.01); *G02B 6/4206* (2013.01); *G02B 3/0087* (2013.01); *G02B 6/3628* (2013.01); *H04B 10/40* (2013.01)

(58) Field of Classification Search
None
See application file for complete search history.

(56) References Cited

U.S. PATENT DOCUMENTS

| 10,545,289 | B1* | 1/2020 | Chriqui | G02B 6/26 |
| 2003/0010904 | A1* | 1/2003 | Luo | G02B 6/4214 |
| | | | | 250/227.11 |
| 2014/0183344 | A1* | 7/2014 | Lee | G02B 6/4214 |
| | | | | 250/227.24 |
| 2019/0265419 | A1* | 8/2019 | Tayebati | G02B 6/32 |

* cited by examiner

*Primary Examiner* — Jerry Rahll
(74) *Attorney, Agent, or Firm* — Grossman Tucker Perreault & Pfleger, PLLC

(57) ABSTRACT

An optical transceiver includes an optical receiver and a fiber array. The fiber array includes a main body and a focusing portion connected to each other, and the focusing portion is located between the main body and the optical receiver.

15 Claims, 6 Drawing Sheets

OPTICAL TRANSCEIVER AND FIBER ARRAY THEREOF

TECHNICAL FIELD

The present disclosure relates to an optical transceiver, more particularly to a fiber array of an optical transceiver.

BACKGROUND

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different specifications have been provided such as XFP (10 Gigabit Small Form Factor Pluggable) used in 10 GB/s communication rate and QSFP (Quad Small Form-factor Pluggable).

With the development of technology, a high-speed optical transceiver, such as 400G, has been utilized to meet the demand of higher communication speed. The communication speed of the optical transceiver is usually determined by bandwidth for signal transmission, and there is a dependence between a spot size of light and achievable bandwidth.

SUMMARY

According to one aspect of the present disclosure, an optical transceiver includes an optical receiver and a fiber array. The fiber array includes a main body and a focusing portion connected to each other, and the focusing portion is located between the main body and the optical receiver.

According to another aspect of the present disclosure, a fiber array of an optical transceiver includes a main body and a focusing portion connected to each other. The focusing portion includes a lens, and an inclined reflecting surface of the main body corresponds to the focusing portion.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
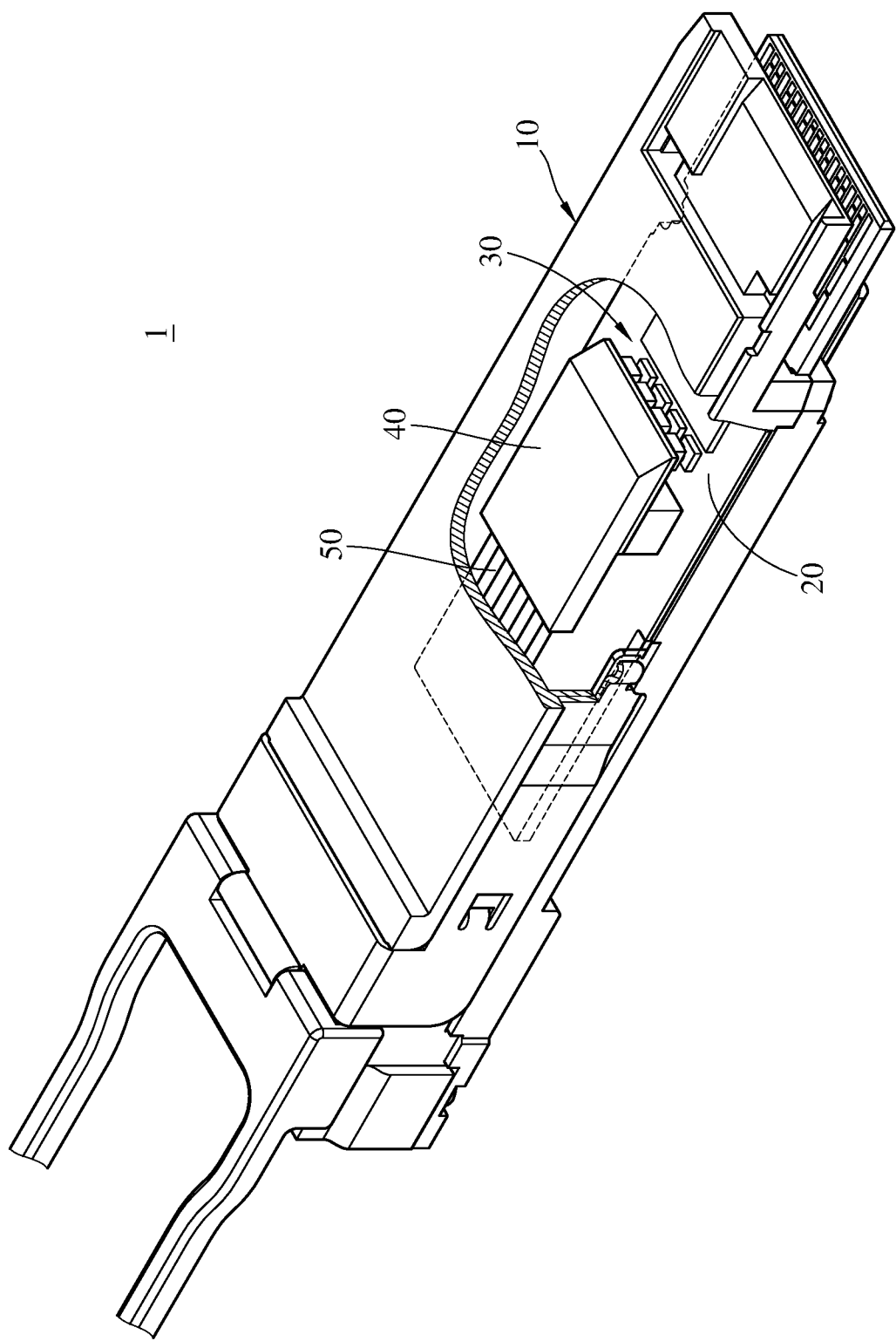
FIG. 1 is a perspective view of an optical transceiver according to a first embodiment of the present disclosure.
Figure 2:
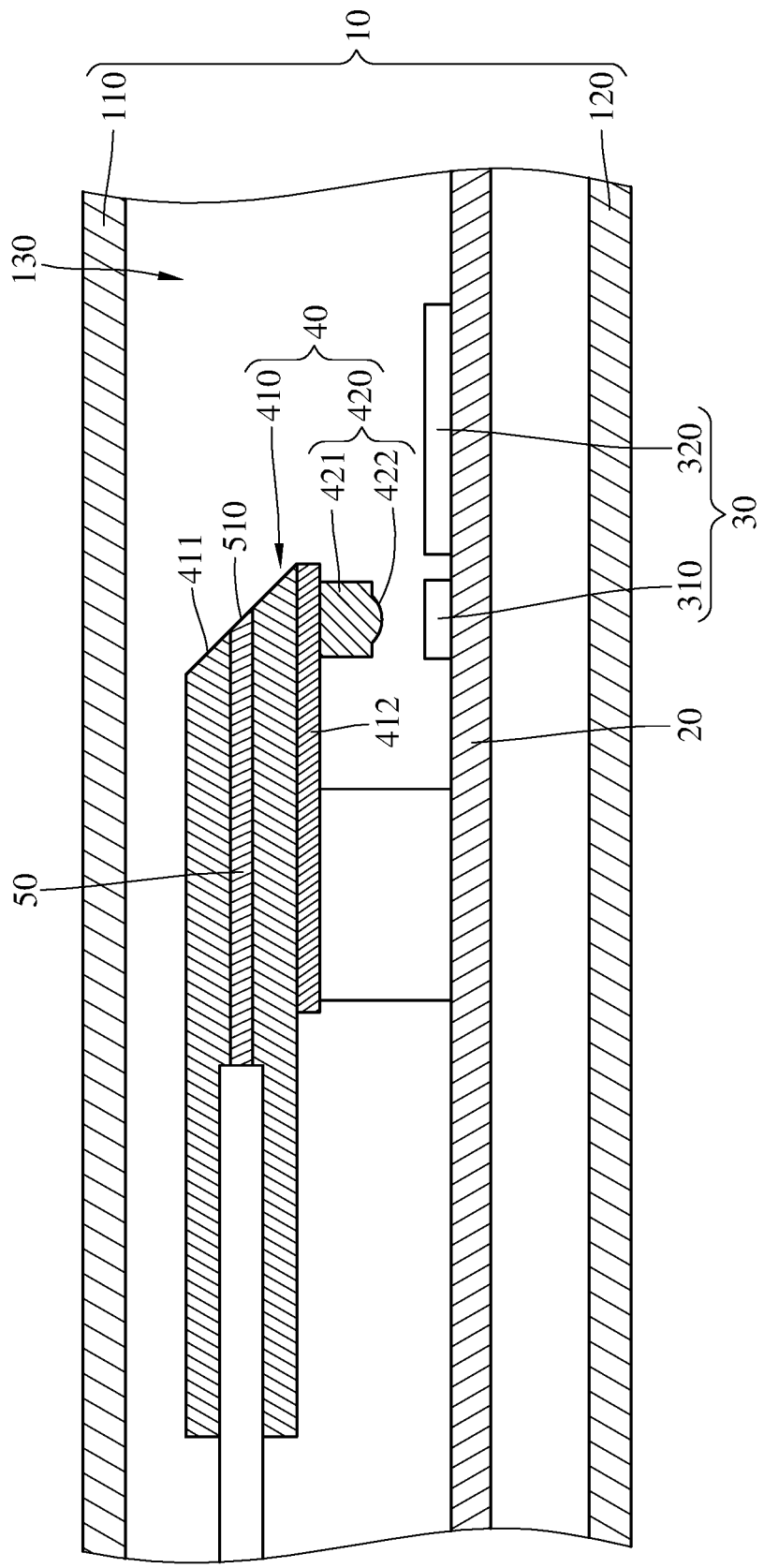
FIG. 2 is a cross-sectional view of the optical transceiver in FIG. 1.
Figure 3:
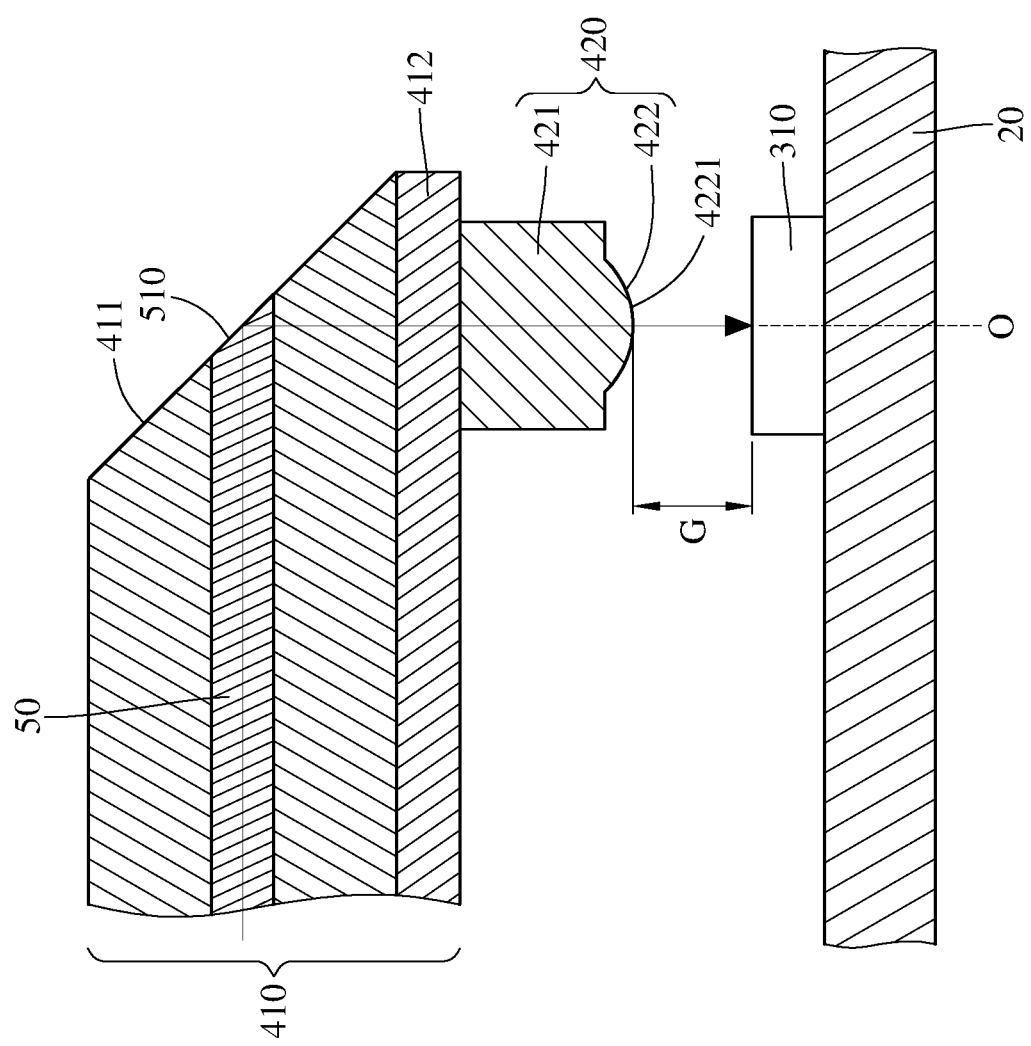
FIG. 3 is an enlarged view of the optical transceiver in FIG. 2.

Please refer to FIG. 1 to FIG. 3. FIG. 1 is a perspective view of an optical transceiver according to a first embodiment of the present disclosure. FIG. 2 is a cross-sectional view of the optical transceiver in FIG. 1. FIG. 3 is an enlarged view of the optical transceiver in FIG. 2. In this embodiment, an optical transceiver 1 includes a housing 10, a substrate 20, an optical receiver 30, a fiber array 40 and an optical fiber 50.

The housing 10 includes a first casing 110 and a second casing 120 assembled with each other. The substrate 20 is located in an accommodation space 130 of the housing 10. The substrate 20, for example, is a circuit board disposed on the second casing 120. For the purpose of illustration, the housing 10 is omitted in FIG. 3.

The optical receiver 30 is disposed on the substrate 20. In this embodiment, the optical receiver 30 is a receiver optical sub-assembly (ROSA) including multiple photodiodes 310 and a transimpedance amplifier (TIA) 320. The photodiodes 310 are electrically connected to the TIA 320. It is worth noting that the number of the photodiodes 310 in the present disclosure is not limited by the above.

The fiber array 40, for example, is a 45 degree fiber array disposed on the substrate 20. The fiber array 40 includes a main body 410 and a focusing portion 420 connected to each other, and the focusing portion 420 is located between the main body 410 and the photodiodes 310 of the optical receiver 30. The focusing portion 420 includes a bar 421 and a lens 422 connected to each other. The bar 421 is located between the main body 410 and the lens 422. A convex surface 4221 of the lens 422 is opposite to the main body 410 and faces toward the photodiodes 310 of the optical receiver 30. An inclined surface 411 of the main body 410 is at an angle about 45 degrees with respect to a horizontal line (dotted line) shown in FIG. 3.

The optical fiber 50 is inserted into the fiber array 40, and an angled facet 510 of the optical fiber 50 is flush with the inclined surface 411 of the main body 410. Both the inclined surface 411 of the main body 410 and the angled facet 510 of the optical fiber 50 correspond to the focusing portion 420.

The number of the focusing portion 420 complies with the number of the optical fiber 50. In this embodiment, the fiber array 40 includes single focusing portion 420 corresponding to single optical fiber 50 inserted into the fiber array 40. In some other embodiments, the fiber array includes multiple focusing portions corresponding to multiple optical fibers, respectively.

The optical path in the optical transceiver 1 is shown in FIG. 3. When light traveling in the optical fiber 50 reaches the angled facet 510, the light is reflected by the angled facet 510 before traveling toward the focusing portion 420 of the fiber array 40. The light may pass through the bar 421 and the lens 422 before converging to a spot, so that the photodiodes 310 of the optical receiver 30 could receive it. The focusing portion 420 of the fiber array 40 is for reducing a spot size of the light so as to increase the bandwidth for signal transmission, thereby improving coupling efficiency and data rate for the signal communication to meet the demand of high communication speed.

In this embodiment, the focusing portion 420 includes the bar 421 and the lens 422. Compared to a single lens, the bar 421 could render less complicated and costly manufacturing of the focusing portion 420.

Moreover, an air gap G presented between the lens 422 of the focusing portion 420 and the photodiode 310 of the optical receiver 30 is smaller than or equal to 150 micrometers ($\mu m$). The air gap G may result in a proper optical path for the light to converge and therefore reduce the spot size of the light without undermining compactness of the optical transceiver 1.

Furthermore, the refractive index of the focusing portion 420 of the fiber array 40 is from 1.46 to 3.5. In this embodiment, the focusing portion 420 is made of silicon. Therefore, the light could converge for the proper spot size to be present within a short optical path.

In addition, the main body 410 of the fiber array 40 includes a graded-index layer 412 corresponding to the focusing portion 420. In detail, the focusing portion 420 is located between the graded-index layer 412 and the optical receiver 30, and the graded-index layer 412 is adjacent to the bar 421 of the focusing portion 420. The graded-index layer 412, for example, is a composite polymer films or a film having nanostructure, such that the refractive index of the graded-index layer 412 increases along a direction from the main body 410 to the focusing portion 420. The graded-index layer 412 is for preventing energy loss when the light passes through the interface between the main body 410 and the focusing portion 420. It is worth noting that the configuration of the main body 410 in the present disclosure is not limited by the above.

In this embodiment, the focusing portion 420 is adhered to the main body 410. Therefore, the focusing portion 420 is able to be disposed on the main body 410 by well-aligned bonding process. It is worth noting that the adhesion between the main body 410 and the focusing portion 420 in the present disclosure is not limited by the above. In some embodiments, the fiber array 40 is a single piece manufactured by molding process, and the main body 410 is integral with the focusing portion 420.

Figure 4:
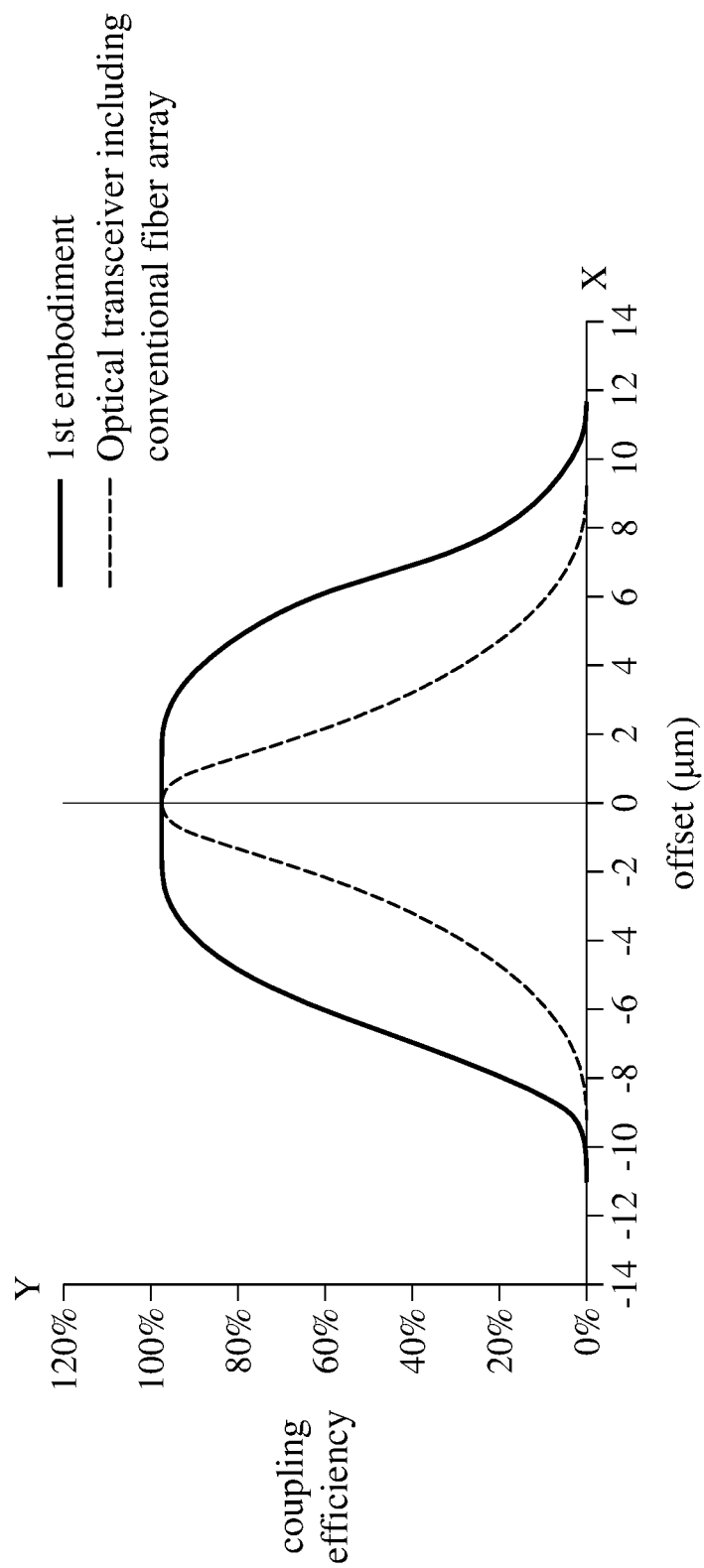
FIG. 4 shows the difference between light coupling efficiency of the embodiment of the present disclosure and that in another optical transceiver including a conventional fiber array without a focusing portion.

FIG. 4 is a chart showing coupling efficiency of an optical receiver of the optical transceiver versus offset according to the first embodiment of the present disclosure. In FIG. 4, the origin of X-axis of the coordinate system corresponds to the center O of the top surface of the photodiode 310 in FIG. 3. A larger offset on the X-axis indicates a position further away from the center O. FIG. 4 shows the difference between light coupling efficiency of the embodiment of the present disclosure and that in another optical transceiver including a conventional fiber array without a focusing portion.

As shown in FIG. 4, with the fiber array 40 including the focusing portion 420, the optical transceiver 1 of the first embodiment enjoys a maximum coupling efficiency up to 97%. The coupling tolerance of the lens 422 and the photodiode 310 is about 5 $\mu m$ at 1 dB coupling efficiency. The optical transceiver including conventional fiber array provides smaller coupling tolerance. Specifically, the coupling tolerance of the conventional fiber array and the photodiode is about 2 $\mu m$ at 1 dB coupling efficiency.

Figure 5:
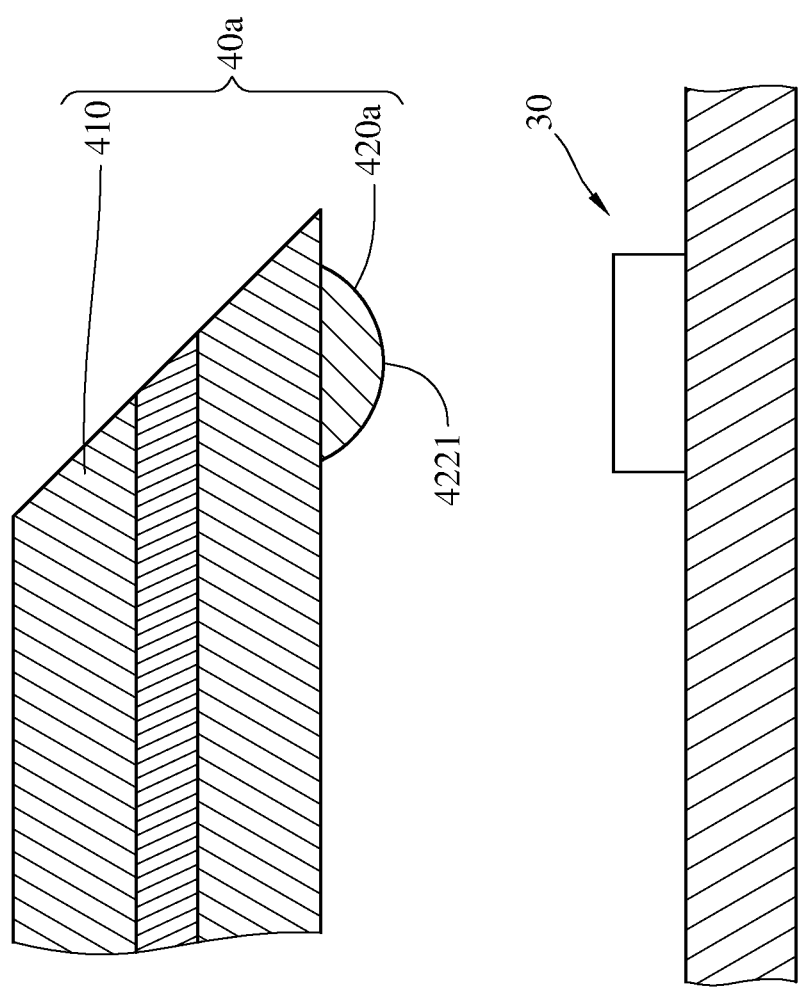
FIG. 5 is a cross-sectional view of an optical transceiver according to a second embodiment of the present disclosure.

The focusing portion of the fiber array includes the bar and the lens in the first embodiment, but the disclosure is not limited thereto. FIG. 5 is a cross-sectional view of an optical transceiver according to a second embodiment of the present disclosure.

In this embodiment, an optical transceiver 2 includes an optical receiver 30 and a fiber array 40a. A housing of the optical transceiver 2 is omitted in FIG. 5 for the purpose of illustration.

The fiber array 40a includes a main body 410 and a focusing portion 420a connected to each other, and the focusing portion 420a is a hemispherical lens having a convex surface 4221 facing toward the optical receiver 30.

Figure 6:
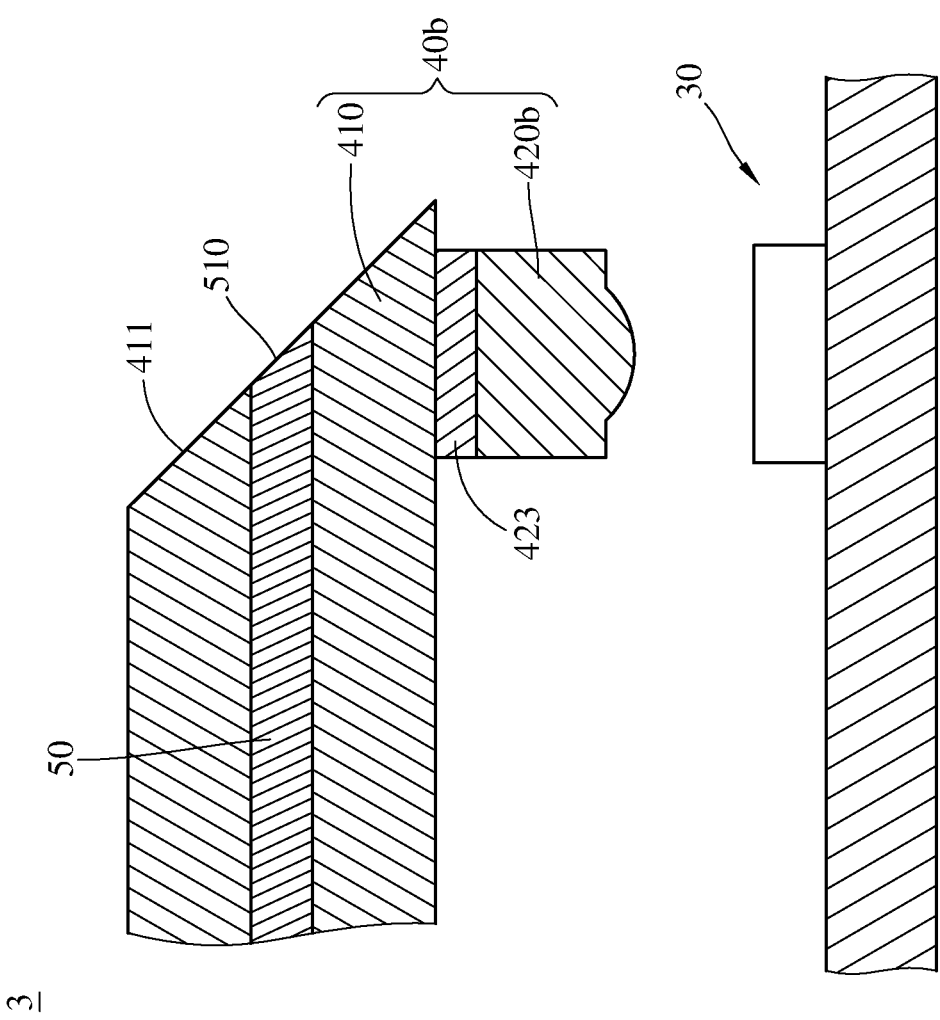
FIG. 6 is a cross-sectional view of an optical transceiver according to a third embodiment of the present disclosure.

In the first embodiment, the light is reflected by the angled facet of the optical fiber to travel toward the focusing portion of the fiber array. FIG. 6 is a cross-sectional view of an optical transceiver according to a third embodiment of the present disclosure.

In this embodiment, an optical transceiver 3 includes an optical receiver 30, a fiber array 40b and an optical fiber 50. A housing of the optical transceiver 3 is omitted in FIG. 6 for the purpose of illustration.

The fiber array 40b includes a main body 410 and a focusing portion 420b connected to each other. The optical fiber 50 is inserted into the fiber array 40b, and an angled facet 510 of the optical fiber 50 is flush with an inclined surface 411 of the main body 410 of the fiber array 40b. The focusing portion 420b includes a graded-index layer 423 adjacent to the main body 410. The graded-index layer 423, for example, is a composite polymer films or a film having nanostructure.

According to the present disclosure, the fiber array of the optical transceiver includes the focusing portion corresponding to the optical receiver. When the light passes through the focusing portion, the light converges to a spot before being properly received by the optical receiver. The focusing portion is for reducing a spot size of light so as to increase the bandwidth for signal transmission, thereby improving the coupling efficiency and improving the data rate to meet the demand of high communication speed.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical transceiver, comprising:
    an optical receiver;
    a fiber array comprising a main body and a focusing portion connected to each other, and the focusing portion being located between the main body and the optical receiver; and
    wherein a graded-index layer is disposed between the main body and the focusing portion.

2. The optical transceiver according to claim 1, wherein the focusing portion of the fiber array comprises a bar and a lens connected to each other, the bar is located between the main body and the lens, and a convex surface of the lens faces toward the optical receiver.

3. The optical transceiver according to claim 2, wherein an air gap is presented between the lens of the focusing portion and the optical receiver, and the air gap is smaller than or equal to 150 micrometers.

4. The optical transceiver according to claim 1, wherein an inclined surface of the main body of the fiber array corresponds to the focusing portion.

5. The optical transceiver according to claim 1, further comprising an optical fiber disposed on the fiber array, wherein an angled facet of the optical fiber corresponds to the focusing portion.

6. The optical transceiver according to claim 1, wherein a refractive index of the focusing portion of the fiber array is from 1.46 to 3.5.

7. The optical transceiver according to claim 1, wherein the focusing portion is adhered to the main body.

8. The optical transceiver of claim 1, wherein a refractive index of the graded-index layer increases along a direction from the main body to the focusing portion.

9. A fiber array of an optical transceiver, comprising a main body and a focusing portion connected to each other, the focusing portion comprising a lens, and an inclined surface of the main body corresponding to the focusing portion; and
wherein a graded-index layer is disposed between the main body and the focusing portion.

10. The optical transceiver of claim 9, wherein a refractive index of the graded-index layer increases along a direction from the main body to the focusing portion.

11. The fiber array according to claim 9, wherein the focusing portion further comprises a bar connected to the lens, and the bar is located between the main body and the lens.

12. The fiber array according to claim 9, wherein a convex surface of the lens is opposite to the main body.

13. The fiber array according to claim 9, wherein a refractive index of the focusing portion is from 1.46 to 3.5.

14. The optical transceiver of claim 9, wherein the graded-index layer is disposed between the inclined surface of the body and the focusing portion.

15. The optical transceiver according to claim 9, wherein the focusing portion is adhered to the main body.

* * * * *